United States Patent
Thai et al.

(10) Patent No.: US 11,196,633 B2
(45) Date of Patent: Dec. 7, 2021

(54) GENERALIZED CORRELATION OF NETWORK RESOURCES AND ASSOCIATED DATA RECORDS IN DYNAMIC NETWORK ENVIRONMENTS

(71) Applicant: International Business Machines Corporation, Armonk, NY (US)

(72) Inventors: Vinh Tuan Thai, Cork (IE); Jack Richard Buggins, London (GB); Luke Taher, Heswall (GB); Ian Manning, Church Hill (IE)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/692,329

(22) Filed: Nov. 22, 2019

(65) Prior Publication Data

US 2021/0160142 A1    May 27, 2021

(51) Int. Cl.
*H04L 12/24* (2006.01)

(52) U.S. Cl.
CPC ............ *H04L 41/12* (2013.01); *H04L 41/085* (2013.01); *H04L 41/0813* (2013.01); *H04L 41/22* (2013.01)

(58) Field of Classification Search
CPC ... H04L 41/12; H04L 41/0813; H04L 41/085; H04L 41/22
See application file for complete search history.

(56) References Cited

U.S. PATENT DOCUMENTS

| | | | |
|---|---|---|---|
| 8,738,972 B1 | 5/2014 | Bakman et al. | |
| 8,930,964 B2 | 1/2015 | Balakrishnan | |
| 9,679,243 B2 | 6/2017 | Zou | |
| 10,212,044 B2 | 2/2019 | Mermoud | |
| 10,216,828 B2 | 2/2019 | Singh et al. | |
| 10,482,375 B2* | 11/2019 | Rossi | G06K 9/6232 |
| 2017/0010931 A1 | 1/2017 | Agarwal | |
| 2017/0032273 A1 | 2/2017 | Ho et al. | |
| 2017/0279830 A1 | 9/2017 | Mermoud | |

(Continued)

OTHER PUBLICATIONS

"One-hot", Wikipedia, last edited on Jan. 20, 2020, 3 pages, <https://en.wikipedia.org/wiki/One-hot>.

(Continued)

*Primary Examiner* — Backhean Tiv
*Assistant Examiner* — Joseph M Cousins
(74) *Attorney, Agent, or Firm* — Scott S. Dobson

(57) ABSTRACT

Topology information including a plurality of snapshots of a network topology associated with respective points in time for a network can be received by an apparatus. Each snapshot is represented as a graph of nodes each corresponding to a network resource and having a node identifier. The graph for each snapshot is modified by replacing nodes representing network resources having the same role in the network with a single aggregated node. Feature learning is performed based on the modified graphs representing the plurality of snapshots, and determines a feature representation for each node in the modified graphs. An identifier for each node in the plurality of snapshots is associated with the corresponding feature representation for use in the correlation of network resources. Node identifiers for nodes in the same aggregated node in a modified graph are associated with the same feature representation.

20 Claims, 6 Drawing Sheets

(56) References Cited

U.S. PATENT DOCUMENTS

| | | | |
|---|---|---|---|
| 2017/0315795 A1 | 11/2017 | Keller | |
| 2018/0336081 A1 | 11/2018 | Tee | |
| 2019/0165988 A1 | 5/2019 | Wang et al. | |
| 2019/0286504 A1* | 9/2019 | Muntes-Mulero | G06F 11/079 |
| 2021/0019558 A1* | 1/2021 | Edge | G06F 16/2465 |
| 2021/0027182 A1* | 1/2021 | Harris | G06N 99/00 |

OTHER PUBLICATIONS

"Text generation with an RNN", TensorFlow, last updated Apr. 1, 2020, 20 pages, <https://www.tensorflow.org/tutorials/text/text_generation>.

"tf.keras.layers.Dense", TensorFlow, last updated Mar. 31, 2020, 3 pages, <https://www.tensorflow.org/ap_docs/python/tf/keras/layers/Dense>.

Bontemps et al., "Collective Anomaly Detection based on Long Short Term Memory Recurrent Neural Network", downloaded from the internet on Apr. 7, 2020, 12 pages, <https://arxiv.org/ftp/arxiv/papers/1703/1703.09752.pdf>.

Gartley et al., "Topological Anomaly Detection Performance with Multispectral Polarimetric Imagery", Proceedings of SPIE, 2009, 12 pages, vol. 7334 73341O-1, <http://www.cis.rit.edu/~mxgpci/pubs/gartley-7334-1.pdf>.

Jin et al., "Learning Graph-Level Representations with Recurrent Neural Networks", arXiv:1805.07683v4 [cs.LG], Sep. 13, 2018, 16 pages, <https://arxiv.org/pdf/1805.07683.pdf>.

Noble et al., "Graph-Based Anomaly Detection", Special Interest Group on Knowledge Discovery and Data Mining (SIGKDD), Aug. 24-27, 2003, 7 pages, Washington, DC, USA, <http://www.ailab.wsu.edu/subdue/papers/NobleKDD03.pdf>.

Buggins et al., "Anomaly Detection in Network Topology", U.S. Appl. No. 16/928,474, filed Jul. 14, 2020.

Dong et al., "metapath2vec: Scalable Representation Learning for Heterogeneous Networks," KDD 2017 Research Paper, pp. 135-144, ACM, https://ericdongyx.github.io/papers/KDD17-dong-chawla-swami-metapath2vec.pdf.

Grover et al., "node2vec: Scalable Feature Learning for Networks," KDD '16: Proceedings of the 22nd ACM SIGKDD International Conference on Knowledge Discovery and Data Mining, Aug. 2016, pp. 855-864. DOI: 10.1145/2939672.2939754.

Cohen, E., "node2vec: Embeddings for Graph Data," Towards Data Science, Apr. 16, 2018, 13 pages https://towardsdatascience.com/node2vec-embeddings-for-graph-data-32a866340fef.

Nguyen et al. "Continuous-Time Dynamic Network Embeddings," WWW '18 Companion Proceedings of the The Web Conference 2018, Apr. 2018, pp. 969-976, ACM. DOI: 10.1145/3184558.3191526.

De Winter et al., "Combininng Temporal Aspects of Dynamic Networks with node2vec for a more Efficient Dynamic Link Prediction," DyNo Workshop ASONAM, Aug. 28, 2018, KU Leuven, 28 pages. dyno.sci-web.net/keynotes/DeWinter.pdf.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

GENERALIZED CORRELATION OF NETWORK RESOURCES AND ASSOCIATED DATA RECORDS IN DYNAMIC NETWORK ENVIRONMENTS

BACKGROUND

The present disclosure relates to correlation of network resources and, more particularly, to correlation of data records associated with network resources in dynamic network environments.

SUMMARY

Embodiments can be directed towards a computer-implemented method. The method receives topology information for a network. The topology information includes a plurality of snapshots of the network topology associated with respective points in time. Each snapshot is represented as a graph of nodes, each node corresponding to a network resource and having a node identifier. For each snapshot, the method modifies the graph by replacing nodes representing network resources having the same role in the network with a single aggregated node. Feature learning is performed based on the modified graphs representing the plurality of snapshots. The feature learning determines a feature representation for each node in the modified graphs. For each node in the plurality of snapshots, the method associates the node identifier for the node with a corresponding feature representation for use in the correlation of network resources. Node identifiers for nodes in the same aggregated node in a modified graph are associated with the same feature representation.

Embodiments can be also directed towards an apparatus. The apparatus includes a feature learning module including a processor and data storage. The processor is configured to receive topology information for a network. The topology information includes a plurality of snapshots of the network topology associated with respective points in time. Each snapshot is represented as a graph of nodes, each node corresponding to a network resource and having a node identifier. For each snapshot, the processor is configured to modify the graph by replacing nodes representing network resources having the same role in the network with a single aggregated node. The processor is further configured to perform feature learning based on the modified graphs representing the plurality of snapshots. The feature learning determines a feature representation for each node in the modified graphs. For each node in the plurality of snapshots, the processor is configured to associate the node identifier for the node with a corresponding feature representation in the data storage for use in the correlation of network resources. Node identifiers for nodes in the same aggregated node in a modified graph are associated with the same feature representation.

Embodiments can also be directed towards a computer program product. The computer program product includes a computer-readable storage medium having program instructions embodied therewith. The program instructions are executable by a processor to cause the processor to: receive topology information for a network, the topology information including a plurality of snapshots of the network topology associated with respective points in time, each snapshot represented as a graph of nodes, each node corresponding to a network resource and having a node identifier; for each snapshot, modify the graph by replacing nodes representing network resources having the same role in the network with a single aggregated node; perform feature learning based on the modified graphs representing the plurality of snapshots, the feature learning determining a feature representation for each node in the modified graphs for use in the correlation of network resources, and for each node in the plurality of snapshots, associate the node identifier for the node with a corresponding feature representation in the data storage, wherein node identifiers for nodes in the same aggregated node in a modified graph are associated with the same feature representation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
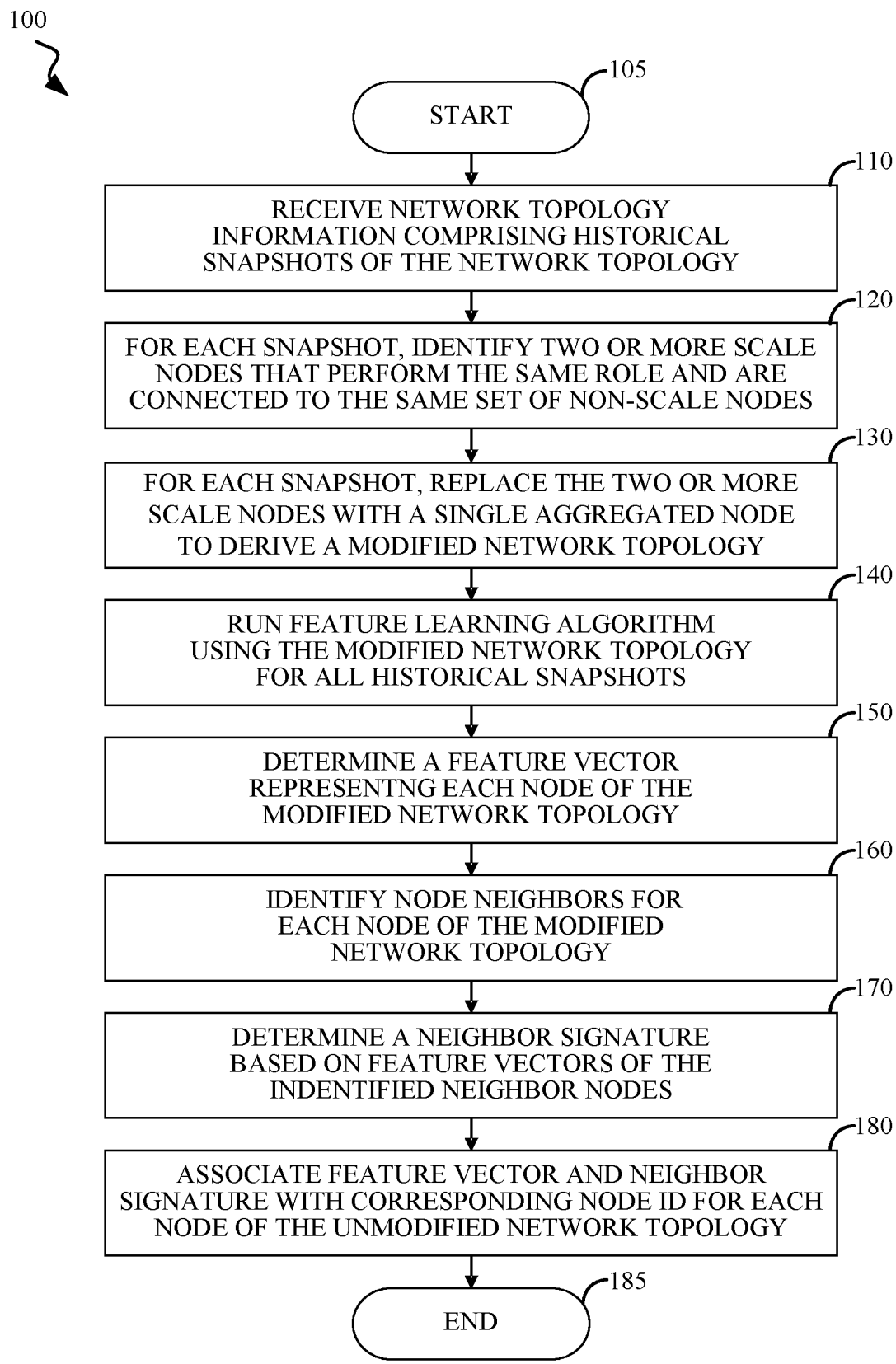
FIG. 1 is a flowchart depicting a method for modifying network topology information of a dynamic network, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Modern computing network environments that include interconnected network resources for storage, processing and communication of data often change dynamically over time. This can be particularly true in virtualized network environments, in which multiple isolated virtualized resources can be created and run independently within a single physical resource. Examples of such virtualized resources, also known as "user-space instances," can include virtual machines and containers. Virtualized resources can be created on a network for a particular purpose and then removed once the purpose is fulfilled. For example, one or more replicas of a virtualized resource can be dynamically created during times of high demand and subsequently removed when demand returns to normal, for the purpose of load balancing. Similarly, additional replicas of a virtualized resource can be created for the purpose of horizontal scaling. Thus, in virtualized network environments, for example implementing containerization style orchestration, e.g., using docker containers or Kubernetes, are dynamic in the sense that they undergo changes in network topology over time and such changes can occur frequently.

In many scenarios, it can be desirable to correlate network resources and their associated data, such as data records relating to the network resources. For example, event messages can be generated by an event monitoring system on a network, when events, e.g., errors, are identified on a network resource. Such event messages can include data fields such as entity ID, entity type and other metadata for the relevant resource and data relating to the value of one or more monitored parameters indicating an event. The event messages are received by an event management system for the network, and are correlated to filter out or combine related event messages to remove noise. This can enable a reduction in the number of event messages presented to an operator for identifying and addressing problems with the network. However, the correlation of event messages relating to virtualized network environments is challenging due to the dynamically changing network resources and network topology. In particular, a single real resource such as a service performing a particular role, can correspond to multiple virtualized resources each having a different identifier or label. Thus, event messages relating to a real resource performing a particular service can originate from multiple different and dynamically changing resources, e.g., replicas, and therefore include multiple different and dynamically changing resource identifiers or labels. As a result, conventional event correlation techniques can be unable to correlate event messages relating to the same real resource into the same correlation group.

The present disclosure proposes a technique for resource representation which enables correlation of resources in dynamic networks, including virtualized network environments such as containerized systems environments having dynamically changing resources.

Embodiments can provide methods, systems and computer program products for determining improved feature representations for resources in dynamic network environments. The feature representations derived in accordance with the present disclosure facilitate the correlation of network resources and associated data records as the resources and topology of the network dynamically changes over time.

Example implementations of the present disclosure concern correlation of event messages in an event management system in a virtualized network environment, as described herein. It can be appreciated that the principles of the present disclosure can be extended more widely to correlating resources and other types of associated data record in any type of dynamically changing network.

In the present disclosure, the term "network" is used to refer to a computing or other data processing, communications or similar network of interconnected resources. The term "network topology" generally refers to the arrangement of resources and connections of a network. A "network" and its "network topology" can be considered as a graph of "nodes" and "edges." Thus, the term "node" refers to an individual "resource" within a network topology, which can include any individually identifiable resource including a virtualized resource, e.g., Kubernetes container with pod or image label. A node or resource can be identified by metadata within a topology management system including an "entityType" data parameter having values such as "application," "database, "router" etc. Similarly, the term "edge" refers to a relationship or connection between two individual resources, i.e., nodes. Edges are directed and labeled to indicate the nature and direction of the relationship between the nodes. The present disclosure describes obtaining a "feature representation" of a resource or node of a network, which is typically determined by calculating a "feature vector" or "embedding" defining a point in a feature or embedding space. Accordingly, the terms "feature representation," "feature vector" and "embedding" are used synonymously in the present disclosure.

The present disclosure distinguishes between two different types of resource or node, referred to herein as "scale nodes" and "non-scale nodes," in a network that changes dynamically over time, e.g., a virtualized network environment. In particular, "scale nodes" are a type of node representing a network resource, wherein multiple instances of the resource can exist concurrently in a network topology, e.g., multiple virtualized resources. Thus, scale nodes can include uniquely identifiable resources that perform the same role or service in the network topology. Thus, at one point in time, the network topology can include multiple scale nodes performing the same role, including one or more replicas that are dynamically added to, and removed from, a network, for example for load balancing as described above. It can be appreciated that, at another point in time, the network topology can include only a single scale node for performing the role. In contrast "non-scale nodes" are a type of node representing a network resource, wherein only one instance can exist in a network topology at any point in time. Thus, "non-scale nodes" are nodes representing resources that are generally static in the network topology, and change only when one instance is removed, e.g., due to an error or otherwise, and a new instance is created. A node in a network topology can be identified as a scale node or non-scale node from data parameters associated with the node in the network topology data, such as "replication setting," "state" or other data parameter indicating how many instances can exist at a time. For example, a node with a replication setting of "1" is a non-scale node, while a node with a replication setting of "3" is a scale node. In addition, certain types of node can be designed to automatically replicate, and so will always be classified as scale nodes, e.g., Kafka bus pods and Kafka nodes, while other types of node can be designed not to replicate, e.g., lift and shift from On-Premise architecture. Accordingly, a "node type" data parameter can be used to identify whether a node is a scale node or a non-scale node. Finally, a scale node can be identified from a combination of data parameters for the node and its neighbors in the network topology metadata. For instance, the "entityType" parameter of a resource and its relationship to its neighbors, can identify scale nodes. For example, where multiple Cassandra Database (DB) instances have the same "entityType" data parameter and are connected to the same node, which has an entityType of "WebApplication," and the edges have the same relationship name, e.g., "backedBy," then this indicates a web application is backed by multiple DB instances and so each Casandra DB instance is a scale node.

FIG. 1 is a flowchart depicting a method 100 for obtaining feature representations of nodes corresponding to resources of a dynamic network, in accordance with example implementations of the present disclosure.

The method 100 starts at step 105. According to embodiments, the method 100 can be performed periodically, or in response to a trigger event. For example, the method 100 can be performed at periodic intervals or start in response to a change in the topology of the dynamically changing network, e.g., a non-transient change in network topology.

At operation 110, the method receives network topology information including historical snapshots of the topology of the network. The historical snapshots can include a most recent snapshot of the network topology and one or more previous historical snapshots of the network topology. In particular, each "snapshot" includes network topology information for the arrangement of resources and connections of the network at a particular point in time. The network topology information can be obtained from a data storage having snapshot data received from a network topology discovery mechanism or the like. Any suitable network topology discovery mechanism can be used to capture and maintain the network topology information, including the historical snapshots. As the skilled person will appreciate, the topology of a dynamic network changes over time as resources are dynamically added to and removed from the network. Thus, raw network topology information obtained for a single snapshot, e.g., the most recent snapshot, can not contain adequate information for deep learning in relation to the network. In accordance with the present disclosure, historical network topology information including multiple snapshots is used for deep learning. In particular, network topology information in historical snapshots can be used, for example, to identify stable parts of the network that change minimally over time and, conversely, parts of the network that change frequently over time. Thus, the use of historical snapshots provides richer topology information for facilitating improved learning about the features and behavior of the dynamic network.

At operation 120, the method identifies two or more scale nodes that perform the same role, and are connected to the same set of non-scale nodes, in each snapshot of the network topology. In particular, operation 120 compares nodes in each historical snapshot of the network topology with the other nodes in the same snapshot of the network topology. Operation 120 can identify scale nodes in the network topology from data parameters of topology metadata associated with each resource or node, as described above. In addition, operation 120 can identify the role, e.g., function or purpose, of each identified scale node and its connections to non-scale nodes from the topology metadata. It can be understood that scale nodes that have both the same role and the same connection(s) to non-scale nodes in the network topology are performing the exact same role, or "functionality," in the network, e.g., as replicas for the purpose of load balancing etc. Thus, operation 120 is able to identify groups of two or more scale nodes that perform the same role and are connected to the same non-scale nodes from the topology information. It can be understood that in any single snapshot of the network topology, multiple groups of scale nodes associated with different roles or services can be identified.

At operation 130, the method modifies each network topology snapshot, by replacing scale nodes within a group of scale nodes having the same role and connected to the same set of non-scale nodes, as identified in operation 120, with a newly created, single aggregated node. The single aggregated node has a new node identifier. Thus, operation 130 modifies each snapshot to derive modified topology information representing a modified network topology. The process of replacing the scale nodes with a single aggregated node is referred to herein as "collapsing scale nodes" and the single "aggregated node" is also referred to herein as a "synthetic node." In example implementations, operation 130 replaces all the nodes belonging to an identified group of scale nodes with a single aggregated node. Thus, each scale node in a group of scale nodes is associated with the same node identifier, i.e., a new identifier for the aggregated/synthetic node. In addition, operation 130 replaces the set of edges that start from each scale node in a group of scale nodes with a single "aggregated edge," which can be weighted based on an average of the weights of the combined set of edges, or using another suitable technique for combining the edge weights. Thus, operation 130 modifies the network topology information of each historical snapshot, by identifying "scale nodes" that perform the same role or service within the network, and collapsing them into a combined or aggregated node, so that they are treated as a single resource for the purposes of determining feature representations thereof. In example implementations, operation 130 can associate the original node identifier of each scale node represented by an aggregated node with the corresponding aggregated node identifier. For example, operation 130 can store corresponding mapping information for mapping original node identifiers to aggregated node identifiers.

Figure 2A:
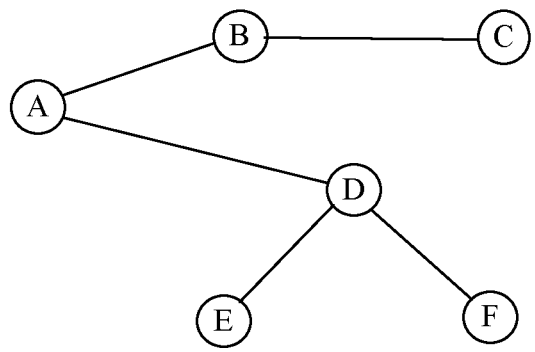
FIGS. 2A and 2B are schematic diagrams depicting example snapshots of the topology of a network as a graph of nodes and edges, according to embodiments consistent with the figures.
Figure 2B:
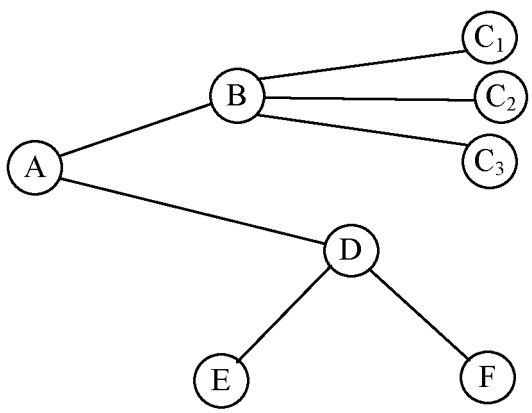
Figure 2C:
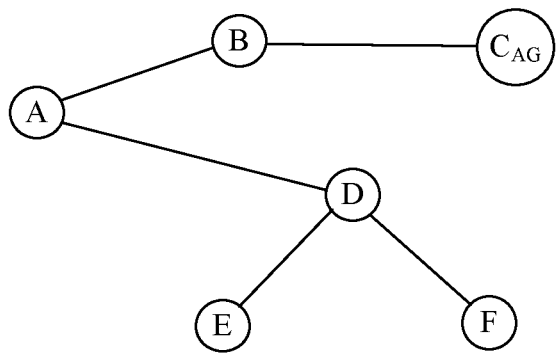
FIG. 2C is a schematic diagram depicting the snapshot of the topology of the network of FIG. 2B as a modified graph, according to embodiments consistent with the figures.

FIGS. 2A and 2B schematically illustrate example network topology snapshots. In particular, FIG. 2A shows a graph 200A including nodes A-F connected by edges in accordance with the network topology at a first point in time, and FIG. 2B shows a graph 200B including nodes A-F connected by edges in accordance with the network topology at a second point in time. The network topology is dynamically changed between the first point in time and the second point in time. In particular, two replica nodes C2 and C3 of node C, labeled C1 in FIG. 2B, are added to the network topology. For example, as described above, replica nodes C2 and C3 can be spun out, e.g., as new Kubernetes pods, from scale node C at the second point in time, corresponding to a time of high demand for the role or service performed by node C, for the purpose of load balancing. Accordingly, nodes C1, C2 and C3 are scale nodes that perform the same role and are connected to the same set of non-scale nodes, node B. Thus, operation 130 of the method 100, FIG. 1 modifies the graph 200B of the network topology shown in FIG. 2B, by replacing scale nodes C1, C2 and C3 with a single aggregated node CAG resulting in the modified graph as shown in FIG. 2C.

At operation 140, the method performs feature learning to obtain a feature representation for nodes of the network, using the modified network topology including all of the historical snapshots. For example, operation 140 can run a feature learning algorithm that processes the network topology information of each snapshot, i.e., a graph of nodes and edges representing the network topology at a particular point in time. In particular, the feature learning algorithm determines a "feature vector" for each node of the modified network topology of all of the snapshots. Each feature vector corresponds to node, i.e., network resource or group of resources, of the modified network topology over time. In example implementations, operation 140 runs a feature learning algorithm that optimizes the likelihood of preserving "network neighborhoods" of nodes to determine feature vectors for nodes based on all of the historical snapshots. One example of a suitable feature learning algorithm is the node2vec algorithm. The node2vec algorithm has two main processing stages. A first stage simulates a series of random walks of fixed length per node on a network topology, wherein the random walks are biased or guided by pre-computed transition probabilities, to generate samples. A second stage performs optimization of the samples using stochastic gradient descent (SGD) to maximize the likelihood of preserving network neighborhoods of nodes to learn feature vectors. In the case of the node2vec algorithm, the notion of neighborhoods of nodes includes "structural equivalence" of nodes as well as "communities" of nodes. However, the node2vec algorithm is performed based on a single snapshot of network topology. Thus, operation 140 can run an adapted version of the node2vec algorithm, as described below, which obtains feature vectors for nodes based on all of the modified historical snapshots of network topology from operation 130. It can be understood that the present disclosure can be extended to other suitable feature learning algorithms that determine feature representations of network nodes. Thus, operation 150 determines a "feature vector" representing each node of the modified network topology based on all of the historical snapshots of the topology of the network over time, leading to improved performance learning.

It can be understood that the method 100 can be performed iteratively, as the network topology changes over time and, consequently, when new snapshots become available. Thus, in some example implementations, previous iterations can store the results of operations 120, 130 and 140 (in part) for each of the historical snapshots in data storage. Thus, in some example implementations, operations 120, 130 and 140 are only performed on the most recent snapshot, and any previously unprocessed historical snapshots, for use in obtaining feature vectors for nodes using the results for all the modified historical snapshots, e.g., by optimizing the likelihood of preserving network neighborhoods of nodes as in the Node2vec algorithm.

Operation 160 identifies the neighbors for each node of the modified network topology of the historical snapshots. The node neighbors for a particular node can be identified, according to application requirements. In example implementations, a predetermined number of node neighbors can be identified from random walk samples, for example the predetermined number can correspond to the "Context size" k of the random walks in the algorithm of Example 1 below.

Operation 170 determines a "neighbor signature" for each node of the modified network topology of the historical snapshots, based on the node neighbors identified in operation 160. In particular, the neighbor signature of a node of the modified network topology is determined for the purpose of similarity matching, as described further below. In example implementations, the neighbor signature for a node, which can be an aggregated node, is determined based on the feature vectors of the neighbor nodes identified in operation 160. For example, operation 170 can determine the neighbor signature for a node as an average of the feature vectors of all of the identified neighbor nodes. It can be understood that other techniques for deriving a neighbor signature for a particular node, based on the neighbor nodes identified in operation 160, are possible and contemplated.

Operation 180 associates the feature vector determined in operation 150, and the neighbor signature determined in operation 170, for each node of the network topology. For example, operation 180 can associate the feature vector and neighbor signature determined for each node of the modified network topology with the node identifier of the node in the unmodified network topology information. This can be achieved using the information mapping original node identifiers to aggregated node identifiers as described above in relation to operation 130. Accordingly, scale nodes included in the same aggregated node are associated with the same feature vector and neighbor signature. Thus, the same feature vector and neighbor signature can be associated with multiple node identifiers, e.g., text identifiers, for multiple resources performing the exact same role at the same time. Operation 180 can store the mapping of (original) node identifiers to corresponding feature vectors and/or neighbor signatures in data storage, e.g., a database, for use in correlation techniques as described herein. The method then ends at operation 185.

It can be understood that the method 100, FIG. 1 derives improved feature representations from nodes, i.e., network resources, in dynamic networks, such as in virtualized network environments, in which the topology of the network changes frequently with time. In particular, by deriving a common feature representation for scale nodes that perform the same role and are connected to the same set of non-scale nodes, the feature representations can be more readily used to associate and correlate resources, and associated data, in the network topology.

Example 1 below sets out pseudocode that adapts the node2vec algorithm for performing operations 150 to 170 of the method of FIG. 1, by way of illustration.

---

Prerequisite: Iterate, from the earliest time to the latest time, the network topology information that is available, collect all historical snapshots H over time to capture changes to the topology. Periodically, or each time a certain change happens, a snapshot H of the topology is captured, and a graph of that network topology snapshot is added to the collection, e.g., with an associated time stamp.

CollapseScaleNodes (Graph G = (V, E, W))
    For each set s of "scale nodes" in V having the same role and connected to the same set of "non-scale nodes" ns
        Replace s with a single synthetic node
        Replace all the edges in E which start from any nodes from within the set s to the set ns with a single edge each. The weight of the new edge is the average of the original edges that are collapsed into it.

LearnFeatures (All historical snapshots H of topology, Dimensions d, Walks per node r, Walk length l, Context size k, Return p, In-out q)
    For each graph G = (V, E, W) in the set of all historical snapshots H of topology
        $G_c$ = CollapseScaleNodes(G)
        $\pi$ = PreprocessModifiedWeights($G_c$, p, q)
        G' = (V, E, $\pi$)
        Initialize walks to Empty
        for iter = 1 to r do
            for all nodes u ∈ V do
                walk = node2vecWalk(G', u, l)
                Append walk to walks

```
        f = StochasticGradientDescent(k, d, walks)
        return f
    node2vecWalk (Graph G' = (V, E, π), Start node u, Length l)
        Inititalize walk to [u]
        for walk_iter = 1 to l do
            curr = walk[-1]
            V_curr = GetNeighbors(curr, G')
            s = AliasSample(V_curr, π)
            Append s to walk
        return walk
    /*obtain a feature vector representing the neighbors of each node in a walk using the same
    sampling strategy as during feature learning */
    generateNodeNeighborSignatures(Features f, Graph G' = (V, E, π))
        Initialize an empty map m from vectors to nodes
        For each node v in G'
            nb = GetNeighbors(v, G')
            sig = average of feature vectors of all neighbor nodes in nb after learning
            (available from f which is the result of invoking LearnFeatures above)
            Add (sig, v) to map m
    return map m
```

Return G

Accordingly, the method 100, FIG. 1 performs feature learning using multiple historical snapshots of the network topology received in operation 110, which leads to richer learning as discussed above. For example, the use of multiple historical snapshots enables identification of patterns in the network topology over time, which cannot be derived from a single snapshot of the network topology. In addition, the method 100 modifies the network topology of each snapshot in operation 130 to take into account the common roles that scale nodes can play, for example within a virtualized environment. Thus, scale nodes that perform the same role or functionality, e.g., multiple Kafka pods, are treated as a single aggregated node, and, in consequence, a common feature vector and neighbor signature is derived which is mapped to each scale node within the same scale node group. In addition, in feature learning algorithms that simulate random walks, e.g., node2vec algorithm, the use of a single aggregated node to represent a group of scale nodes having the same role prevents a random walk from one scale node to another scale node with the same role. It can be understood that the relationship between scale nodes having the same role is not significant or informative for feature learning. The main purpose of random walks in feature learning algorithms is to obtain information about relationships between neighbor nodes having different roles. Thus, the use of an aggregated node avoids gathering information that is insignificant, including duplicate information relating to scale nodes having the same role, in random walk samples. This can improve algorithm efficiency. Moreover, the method 100 performs feature learning from all the graphs corresponding to the historical snapshots of the network topology collected over time. This leads to an order of magnitude more data, samples from random walk simulations, by executing the sampling strategy on each snapshot of the topology. The stable parts of the network topology will lead to many occurrences of the same random walks across the snapshots, which contributes useful information to the feature learning algorithm to determine improved feature vectors, for example, by optimization using stochastic gradient descent, as in the node2vec algorithm.

In addition, in accordance with the present disclosure, a new concept of a "neighbor signature" is introduced, for similarity matching to identify nodes that perform the same role, as described below. In particular, operations 160 and 170 of the method 100, FIG. 1 determines a neighbor signature for a particular node based on the feature vectors of neighbor nodes of that particular node. As described in detail below, this enables the identification of a new scale node identified in a fresh data record, e.g., event message, for correlation with existing correlation groups, in scenarios where the new scale node was not present in the historical network topology information used as training data for the correlation, and so a feature vector for the new scale node is not available. In particular, a new scale node can be spun out for the purpose of load balancing in a virtualized environment, and can generate a data record, e.g., event message, before a corresponding feature vector, for an aggregated node including the new scale node, can be determined using the method 100, FIG. 1. Details of how the neighbor signature can be used in the correlation of data records, in particular the correlation of events messages, in such scenarios are provided below with reference to FIG. 3.

Figure 3:
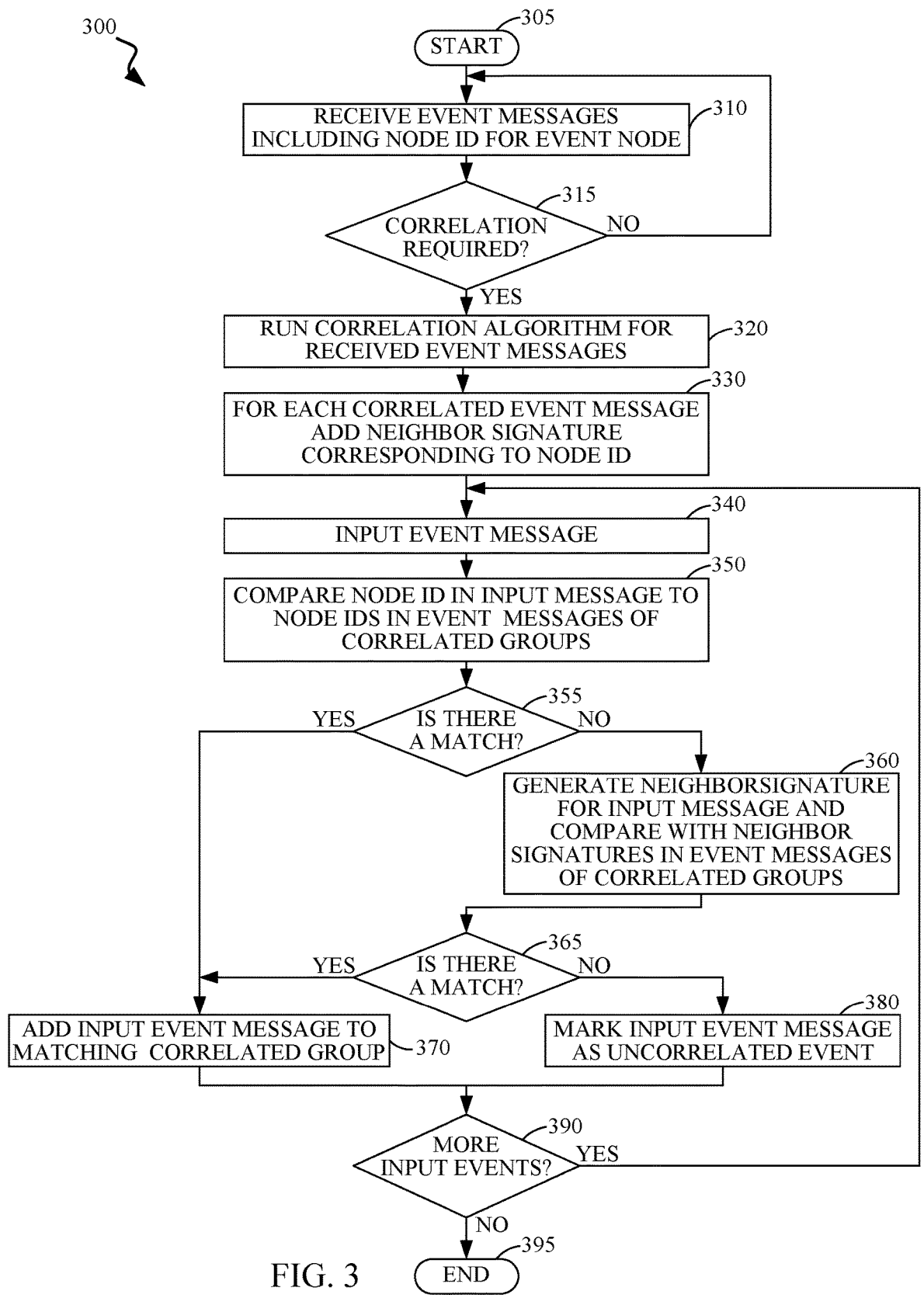
FIG. 3 is a flowchart depicting method for correlation of event messages, according to embodiments consistent with the figures.

FIG. 3 is a flowchart of a method 300 for correlation of event messages, in accordance with example implementations of the present disclosure. In particular, the method 300 can be used to correlate event messages relating to event conditions detected on nodes, herein called "event nodes," in a dynamic network, such as in a virtualized network environment. As described herein, the correlation of event messages is desirable to reduce the total number of individual event messages presented in an event log for an operator of a network management system to address. The method 300 can use the feature vector and neighbor signature for each node of the (unmodified) network topology determined using the method 100, FIG. 1. For example, the method 300 can implement a correlation model trained on historical event data using the method of FIG. 1. The method 300 can be performed by an event management system for the relevant network or the like.

The method 300 starts at operation 305. For example, the method can start in response to start-up of an event management system for the network or otherwise.

At operation 310, the method receives one or more event messages, each event message including a data record having data fields. For example, an event message can include an identifier for the event node, e.g., text identifier or "node ID," metadata for the event, e.g., the event condition and associated parameter values, and an event time, e.g., timestamp. As the skilled person will appreciate, event monitoring tools typically are used to monitor network resources to identify problems that can impact the performance of the network. When predefined events, e.g., predefined event conditions, are identified at a node (the "originator node" or "event node"), the event monitoring tools generate corresponding event messages, which are received by an event management system for the network. Thus, multiple event messages can be received at operation 310 at random intervals over a time period.

Operation 315 determines whether correlation of received event messages is required. The requirement for correlation can be predetermined according to application requirements or otherwise. For example, correlation can be required once a predefined threshold number of event messages appears in the event log, or if a predefined threshold number of events are received within a time interval or after a predetermined periodic time interval. If operation 315 determines that correlation of the event messages is not required, the method returns to operation 310. However, if operation 315 determines the correlation of the event messages is required, the method proceeds to operation 320.

At operation 320, the method runs a correlation algorithm to correlate event messages into correlation groups based on a correlation relationship. One suitable correlation technique for event messages is temporal correlation, in which event messages are correlated based on the time each message is generated, i.e., using the aforementioned "timestamp" data field or equivalent. In particular, when a problem arises with a first resource (first event node) on a network, an event message is generated not only for that resource, but also for other related, e.g., interconnected, resources/event nodes that are affected by the problem with the first resource. This can lead to an avalanche of event messages being generated within a short time window, where all the events are related to each other by a common root cause, i.e., the problem with the first resource. Accordingly, correlation of event messages based on their temporal relationship, for example by correlating event messages generated within a predefined time window, identifies event messages that are likely to be related to the same problem, e.g., have a common root cause. As the skilled person will appreciate, other types of correlation technique can be used to correlate event messages, or other data records associated with network nodes or resources, into correlation groups.

At operation 330, for each event message in each correlation group, the method adds a "neighbor signature" corresponding to the node ID of the event node. For example, operation 330 can obtain the neighbor signature corresponding to the event node identified in an event message from data storage. As indicated above, a mapping between network nodes (text identifiers or "node IDs") and their corresponding neighbor signatures can be stored in suitable data storage, for example in operation 180 of the method 100, FIG. 1.

Accordingly, operation 330 outputs event messages for the event log in correlated groups (e.g., temporally correlated groups), each event message including a node ID and neighbor signature for the relevant event node.

At operation 340, the method receives an input event message. For example, operation 340 can receive input event messages for correlation inference by an inference module, in accordance with the present disclosure. The input event message can be previously correlated, e.g., temporally correlated, event messages, i.e., using operations 310 to 330. The input event messages can also be new event messages received in operation 310, and optionally processed using operation 330 to add, where possible, a neighbor signature.

At operation 350, the method compares the node ID of the input event message with node IDs in event messages within each correlation group. Thus, operation 350 considers whether the event node of the input event message is also an event node in an event message with an existing correlation group.

Operation 355 determines whether operation 350 has identified a match between the node ID in the input event message, and the node ID of at least one event message in one of the correlation groups. If operation 355 determines that there is a node ID match, the method proceeds to operation 370 which adds the input event message to the correlation group containing the one or more event messages having a matching node ID, for presentation in the event log. The method then continues with operation 390. However, if operation 355 determines that there is no match between the node ID of the input event message and node IDs of event messages of the correlation groups, the method proceeds to operation 360.

At operation 360, the method generates a neighbor signature for the event node of the input event message, and compares the generated neighbor signature with neighbor signatures in event messages within each correlated group. Operation 360 can generate a neighbor signature for the event node using the same process used by the feature learning algorithm to generate neighbor signatures in operation 170 of the method 100, FIG. 1, as described above. In particular, the neighbor signature is generated by the sampling procedure of random walks on the network topology snapshot captured at the time the event message was generated. As described herein, the topology management system typically captures a snapshot every time there is a change in the network topology, and stores the captured topology snapshot data with a timestamp. Thus, operation 360 can generate the neighbor signature for the event node of the input event message by selecting the relevant snapshot corresponding to the timestamp in the event message. Since the event node was present at the time the event message was generated, it will appear in the topology snapshot captured at the same time. In this way, it is possible to determine a neighbor signature for an event node, even if the event node is transient, e.g., a transient scale node connected to a set of non-transient non-scale nodes.

Operation 365 determines whether operation 360 has identified a match between the neighbor signature determined for the input event message, and the neighbor signature of at least one event message in one of the correlation groups. In example implementations, a substantial match of neighbor signatures is sufficient in operation 365. This is because the neighbor signature for the event node of the input event message is determined using feature vectors of the neighbor nodes of the individual scale node, whereas the neighbor signature for existing scale nodes in a scale node group is determined using the feature vectors of neighbor nodes of an aggregated node. Operation 365 can use any suitable method for determining whether the neighbor signatures are a substantial match, for example based on a threshold difference or a percentage threshold difference therebetween. If operation 365 determines that there is a neighbor signature match, the method proceeds to operation 370 which adds the input event message to the correlation group containing the one or more event messages having a matching neighbor signature, for presentation in the event log. The method then continues with operation 390. However, if operation 365 determines that there is no neighbor signature match, the method proceeds to operation 380 which marks the input event message as an uncorrelated event message, for presentation separately in the event log. The method then proceeds to operation 390.

At operation 390 the method determines whether there are any more input event messages. For example, a sequence of input event messages can be received at operation 340 for correlation inference, for example from the abovementioned inference module. If operation 360 determines that there are more event messages available for correlation inference, the method returns to operation 340 which receives the next input event message. The method then continues in a loop through operations 350 to 390 until operation 390 determines that there are no more input events. The method then ends at operation 395.

Accordingly, the method 300, FIG. 3 is able to more easily correlate event messages and other data records for a plurality of network resources that perform the same role in the network topology, but can be distributed throughout the network, in a dynamically changing environment. In particular, by using the improved feature representations for nodes, i.e., network resources, derived using the method 100, FIG. 1, for example, event messages relating to event nodes belonging to a group of nodes performing the same role or service, e.g., a Kubernetes cluster, are readily correlated by matching feature vectors, using the mapping between node identifiers and feature vectors from operation 180 of the method of FIG. 1. In addition, in scenarios in which an input event message includes a node identifier for an event node that does not have a corresponding feature vector, for example because it is a newly spun out node, e.g., new replica node, it is possible to correlate the input event message with other event messages by similarity matching of neighbor signatures. In particular, it is possible to determine a neighbor signature for the event node of the input event message and, using the mapping between node identifiers and neighbor signatures from operation 180, correlate the input event message with one or more other event messages having a substantially matching neighbor signature.

Figure 4:
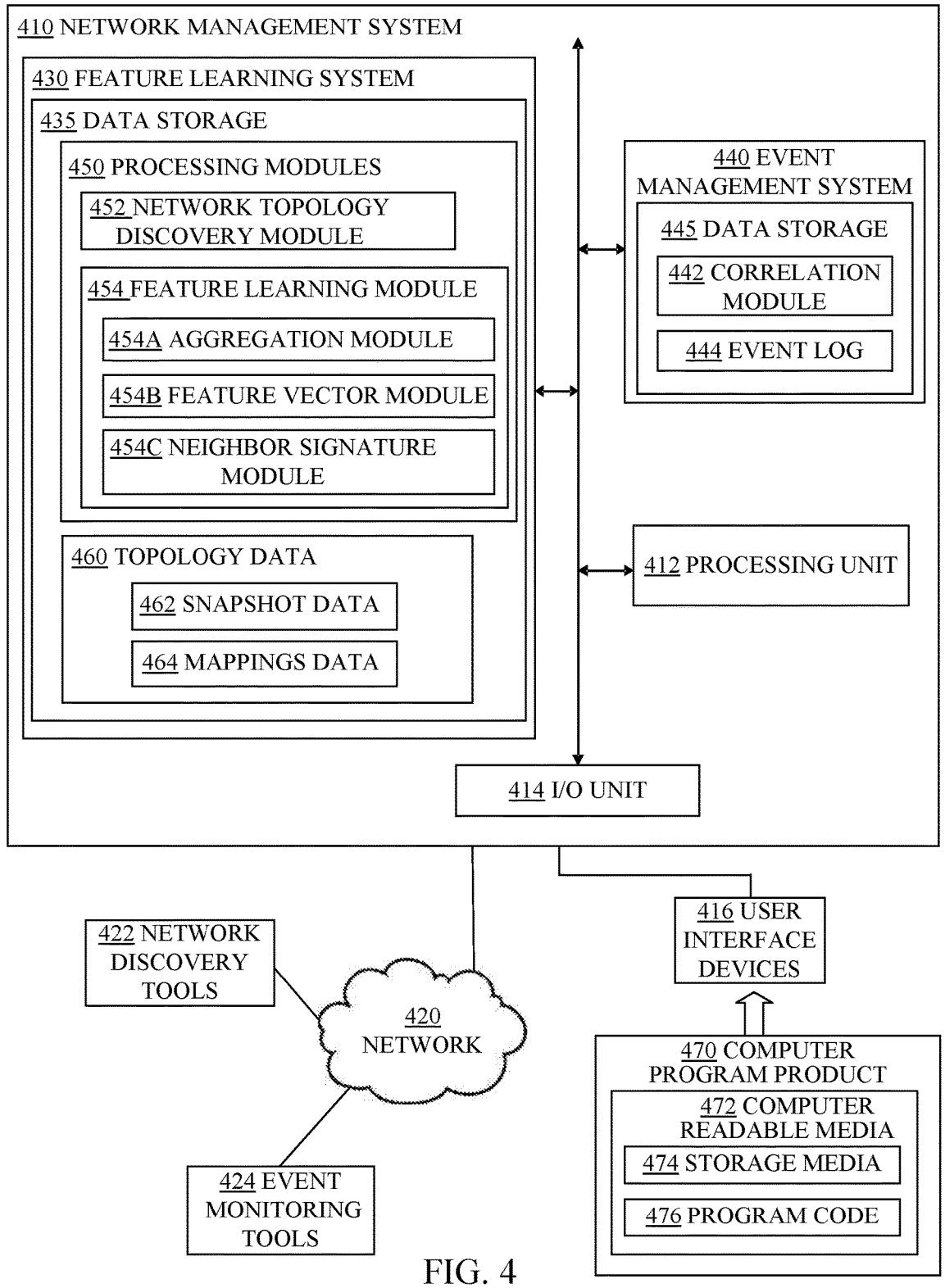
FIG. 4 is a block diagram of a system, according to embodiments consistent with the figures.

FIG. 4 is a block diagram showing a network environment 400 in accordance with example implementations of the present disclosure. In particular, network environment 400 includes a network management system 410 configured for managing a network 420 includes a plurality of interconnected network resources, not shown.

Network management system 410 includes processing unit 412, input output (I/O) unit 414 and user interface devices 416. Processing unit 412 is configured for processing data received from network 420 via I/O unit 414 and/or data stored in data storage 435, 445, for implementing the functionality of network management system 410, including the functionality described herein. User interface devices 416 include, for example, a display and one or more internal or external user input devices such as a mouse, touchpad and microphone. Other features of network management system 410 are omitted for ease of understanding of the present disclosure.

In accordance with the present disclosure, network management system 410 includes feature learning system 430 and event management system 440. Feature learning system 430 is configured to determine feature representations and neighbor nodes signatures for network resources of network 420 based on snapshots of the network topology obtained from network discovery tools 422, as described herein. Event management system 440 is configured to manage event messages received from event monitoring tools 424, and to correlate event messages using feature representations and/or neighbor nodes signatures for network resources of network 420 determined by feature learning system 430. I/O unit 414 is configured for connection to a network 420 for exchanging data with network devices including network discovery tools 422 and event monitoring tools 424. Network 430 can include any suitable wired or wireless data communications network, such as a local area network (LAN), wide area network (WAN), mobile network or the Internet. In accordance with the present disclosure, network 420 includes network resources in a virtualized environment, for example a containerized systems environment, e.g., using docker containers or Kubernetes. In some example implementations, I/O unit 414 is configured for connection to more than one network.

Feature learning system 430 includes data storage 435 including processing modules 450 and topology data 460. Processing modules 450 include instructions executable by processing unit 412 for performing the functionality of feature learning system 430. For example, feature learning system 430 can be configured to perform the method 100, FIG. 1. Topology data 460 includes data that is received by, and/or generated by the functionality of, feature learning system 430.

In accordance with the present disclosure, processing modules 450 include network topology discovery module 452 and feature learning module 454. Topology data 460 includes snapshot data 462 and mappings data 464.

Network topology discovery module 452 is configured to receive snapshots of the network topology, each snapshot representing the network topology at a particular point in time, for storage as snapshot data 462. For example, snapshot data 462 can be received from network discovery tools 422 connected to network 420. In accordance with the present disclosure, snapshot data 462 includes a series of historical snapshots of the topology of network 420 at respective points in time. Thus, each snapshot data instance has an associated time, e.g., timestamp, and can be represented as a graph of nodes and edges, for example as received in operation 110 of the method 100, FIG. 1.

Feature learning module 454 is configured to determine a feature representation, e.g., feature vector, and neighbor signature for each identified node (resource) of the network 420 in the snapshot data 462. In particular, feature learning module 454 includes aggregation module 454A, feature vector module 454B and neighbor signature module 454C. Aggregation module 454A is configured to modify each network topology snapshot by collapsing scale nodes into a single aggregated node, as described herein. For example, aggregation module 454A is configured to perform operations 120 and 130 of the method 100, FIG. 1. Furthermore, in some example implementations, aggregation module 454A stores the modified snapshots in snapshot data 462. Aggregation module 454A can also store a mapping between the aggregated node identifier and the identifiers of the scale nodes represented therein in mappings data 464. Feature vector module 454B is configured to determine a feature vector for each node of the network 420 in the snapshot data 462, based on all of the modified snapshots in snapshot data 462, as described herein. For example, feature vector module 454B is configured to perform operations 140 and 150 of the method 100, FIG. 1. Feature vector module 454B is further configured to store a mapping between the determined feature vector for a node to the corresponding node identifier in mappings data 464, as in operation 180 of the method 100, FIG. 1. Neighbor signature module 454C is configured to determine a neighbor signature for each node of the network 420 in snapshot data 462, based on the feature vectors for neighboring nodes thereof, as described herein. For example, neighbor signature module 454C is configured to perform operations 160 and 170 of the method 100, FIG.

1. Neighbor signature module 454C is further configured to store a mapping between the determined neighbor signature for a node to a corresponding node identifier in mappings data 464, as in operation 180 of the method 100, FIG. 1. In example implementations, feature learning module 454 can implement an algorithm in accordance with the pseudocode of Example 1 as set out above or the like.

Event management system 440 is configured to manage event messages received from event monitoring tools 424 via I/O unit 414. In particular, event monitoring tools 424 monitor network resources of network 420 and can generate and send event messages to event management system 440 when an event condition is identified for a particular resource, i.e., event node. Event management system 440 includes data storage 445 including correlation module 442 and event log 444. As the skilled person will appreciate, data storage 445 can include other processing modules and data, according to application requirements. Correlation module 442 includes instructions executable by processing unit 412 for performing the functionality of event management system 440. In particular, correlation module 442 is configured to perform correlation of event messages using feature representations, feature vectors, and/or neighbor signatures corresponding to events nodes stored in mappings data 464, as described herein. The event messages correlated by correlation module 442 can be presented as correlated events messages in event log 444, for review by an operator using user interface devices 416. For example, correlation module 442 can be configured to perform correlation using operations of the method 300, FIG. 3. In embodiments, correlation module 442 can perform all of the operations of the method 300, FIG. 3, or operations 340 to 390 of the aforementioned inference module of the method 300, FIG. 3.

With continuing reference to FIG. 4, a computer program product 470 is provided. The computer program product 470 includes computer-readable media 472 having storage media 474 and program instructions 476, i.e., program code, embodied therewith. The program instructions 476 are configured to be loaded onto data storage 435 or 445 of network management system 410, using one of user interface devices 416 or a device connected to network 420 via I/O unit 416. In example implementations, program instructions 476 include one or more of feature learning module 454, aggregation module 454A, feature vector module 454B and neighbor signature module 454C of feature learning system 430. In other example implementations, program instructions 496 include correlation module 442 of event management system 440.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
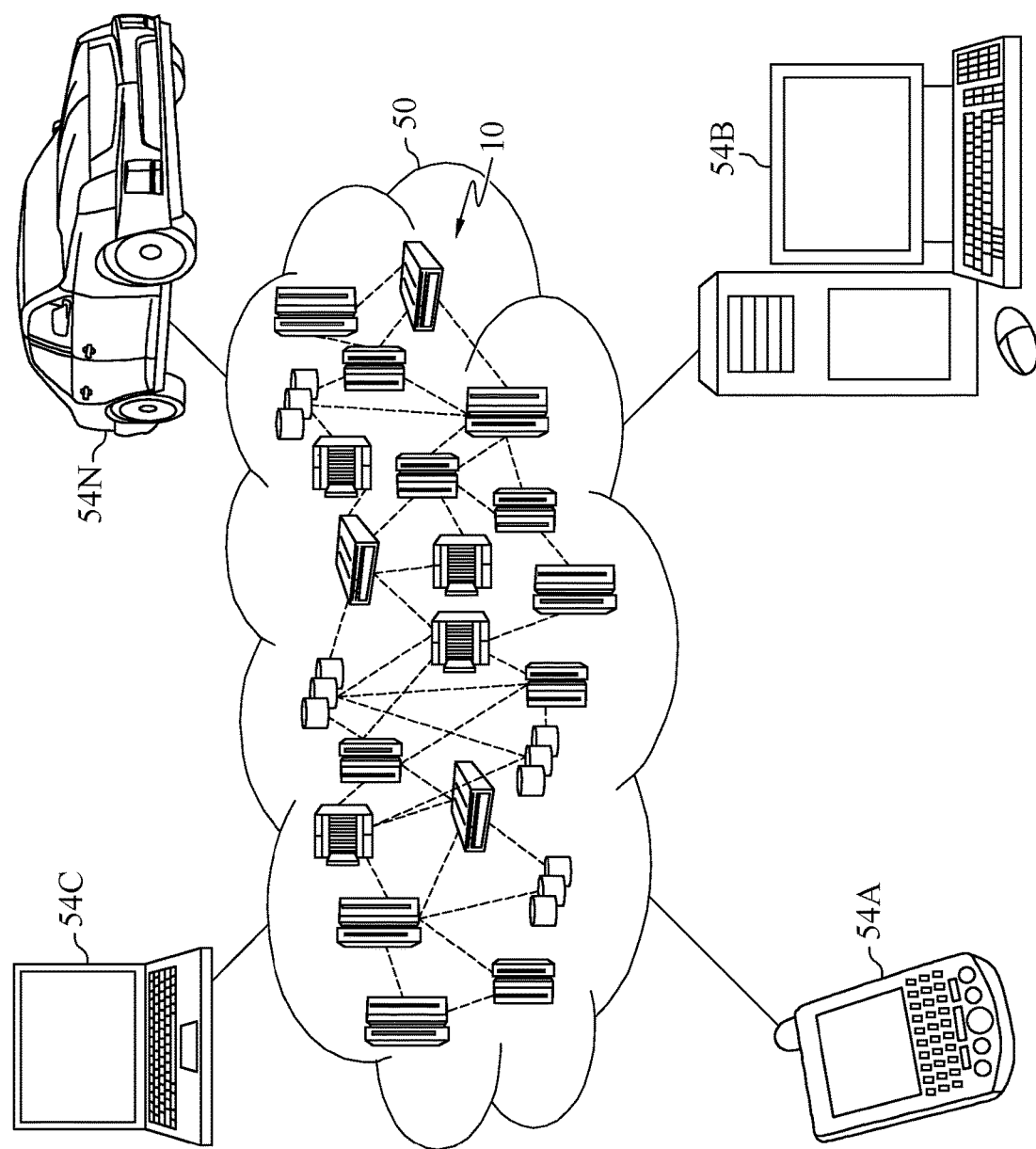
FIG. 5 depicts a cloud computing environment according to according to embodiments consistent with the figures.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
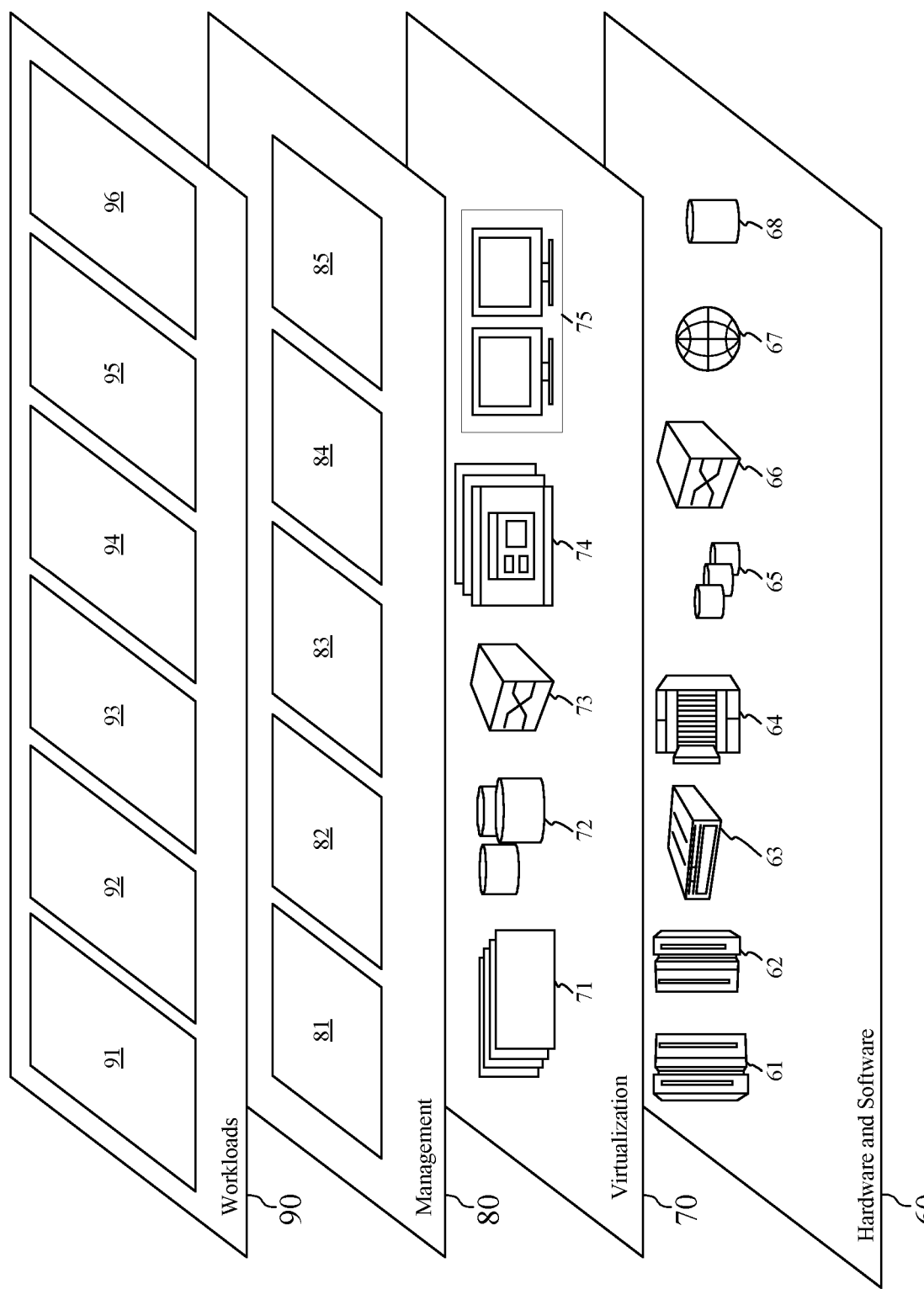
FIG. 6 depicts abstraction model layers according to according to embodiments consistent with the figures.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and correlation of network resources 96.

The methods described herein provide improved feature representations for resources (nodes) of a dynamic network, i.e., having a dynamically changing network topology, such as in a virtualized network environment, as described herein. The improved feature representations allow correlation of, e.g., distributed, network resources that perform the same role or service, e.g., replica nodes, and correlation of their associated data records, in a dynamic network, which cannot be otherwise by correlated due to differences in resource identifier and position with the network topology. In addition, the methods further provide a new type of representation, in the form of neighbor signatures for resources (nodes), which are associated with the corresponding feature representations. The new neighbor signature enables correlation of resources that are new or transient, i.e., short lived, and their associated data records, with other resources that perform the same role, even when a feature vector for the new or transient resource is not available.

The present disclosure therefore proposes a technique that is able to generalize correlation groups of network resources, and their associated data records, in a dynamic network environment, such as a virtualized network environment, as described herein. The technique enables the generalization of correlation groups based on any defined correlation scheme, and are not limited to the generalization of temporally correlated groups. Thus, the technique can be deployed to operate with any existing correlation schemes, e.g., existing/legacy event correlation scheme in an event management system, as well as a standalone correlation technique. In particular, correlation groups are generalized to correlate resources (nodes) performing the same role in a dynamic network, such as replicas of virtualized resources in a virtualized network environment, which are inherently related. In doing so, patterns and relationships between network resources can be learned even in complex network environments, provided the resources are labeled and their roles can be determined.

Furthermore, the present disclosure is not limited to use for correlation, but can be defined more generally as a source analytic generalization and/or abstraction technique for similarity learning processes and the like in relation to dynamic networks. The present disclosure merely requires historical topological data to generalize and abstract nodes (resources) by determining feature representations (feature vectors and node signatures), as described herein, for improved correlation and similarity learning processes. By virtue of the feature learning techniques of the present disclosure, it is possible to gain insights into historical patterns and behavior of a dynamic network. This makes it possible to determine improved correlation or similarity rules for identifying such patterns and behavior of the network using real time data records and/or topology information.

The present disclosure can be implemented easily, without requiring time consuming resource-specific configuration or static labels. Existing data fields of a particular deployment type can be used to identify resources (nodes) performing the same role, i.e., nodes for aggregation, including dynamic "virtualized resources" corresponding to the same "real physical resource," e.g., the "replica-sets" label in a Kubernetes deployment. Accordingly, the technique does not require custom set-up and is robust to future changes in a particular deployment. Furthermore, while the present disclosure is described in relation to particular deployment types, such as Kubernetes and dynamic container orchestrated environments, it can also be applied to hybrid and multi-hybrid cloud deployments in which topological information for all nodes is available.

While the present disclosure has been described and illustrated with reference to example implementations, the skilled person will appreciate that the present disclosure lends itself to many different variations and modifications not specifically illustrated herein.

The present disclosure encompasses a system, a method, and/or a computer program product at any possible technical detail level of integration. The computer program product can include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of a computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer, for example, through the Internet using an Internet Service Provider. In some example implementations, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational operations to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving topology information for a network, the topology information comprising a plurality of snapshots of network topology associated with respective points in time, each snapshot represented as a graph of nodes, each node corresponding to a network resource and having a node identifier;
modifying, for each snapshot, the graph by replacing nodes representing network resources having a same role in the network with a single aggregated node, wherein the modifying comprises:
identifying nodes in the network topology corresponding to scale nodes, wherein a scale node is a type of node for which multiple node instances are permitted to exist in the network topology at a same time;
identifying a group of two or more scale nodes that perform a same role and are connected to a same set of non-scale nodes for which only one node instance is permitted to exist in the network topology at any one time; and
replacing scale nodes of the group of scale nodes with an aggregated node connected to the set of non-scale nodes in the network topology;
performing feature learning based on modified graphs representing the plurality of snapshots, the feature learning determining a feature representation for each node in the modified graphs; and
associating, for each node in the plurality of snapshots, the node identifier for a node corresponding to a network resource with a corresponding feature representation for use in correlation of network resources, wherein node identifiers for nodes in a same aggregated node in a modified graph are associated with a same feature representation.

2. The method of claim 1, wherein the graph of each snapshot comprises edges corresponding to connections between pairs of network resources, the method further comprising:
replacing edges between scale nodes of the group of scale nodes and each non-scale node within the set of non-scale nodes with an aggregated edge.

3. The method of claim 1, wherein performing feature learning to determine a feature representation for each node of the modified graphs comprises:
obtaining, for each modified graph, samples for each node in the modified graph; and
determining, for each node of the modified graphs, a feature representation based on samples obtained from all of the modified graphs representing the plurality of snapshots.

4. The method of claim 3, wherein obtaining samples for each node comprises:
simulating a plurality of random walks starting from each node, wherein each random walk has a fixed walk length and sampling is based on predetermined transition probabilities at each of the steps of the walk.

5. The method of claim 4, wherein determining a feature representation for each node comprises:
performing optimization using stochastic gradient descent to maximize a likelihood of preserving network neighborhoods for each node based on the random walk samples for the node for all of the modified graphs representing the plurality of snapshots; and
determining a feature vector for the node based on the optimization.

6. The method of claim 1, further comprising:
receiving data records from the network, each data record including a node identifier for a node associated with the data record; and
correlating the data records by matching the node identifiers of the data records.

7. The method of claim 1, wherein, for each node in the modified graphs representing the plurality of snapshots, the method further comprising:
identifying node neighbors for the node;
determining, based on feature representations for identified neighbor nodes, a neighbor signature for the node; and
associating, for each node in the plurality of snapshots, the node identifier for the node with a corresponding neighbor signature, wherein node identifiers for nodes in a same aggregated node in a modified graph are associated with a same neighbor signature.

8. The method of claim 7, further comprising:
receiving one or more data records from the network, each data record including a node identifier for a node associated with the data record;
adding, to a data record, the neighbor signature corresponding to the node identifier included in the data record; and
correlating at least one data record by matching the neighbor signature of the data records.

9. The method of claim 8, further comprising:
receiving an input data record including a node identifier that does not match a node identifier in other data records;
receiving a snapshot of the network topology associated with the time of the input data record;
identifying neighbor nodes for the node corresponding to the node identifier of the input data record based on the received snapshot;

determining a neighbor signature for the node corresponding to the node identifier of the input data record based on feature representations for the identified neighbor nodes;

comparing the determined neighbor signature for the node corresponding to the node identifier of the input data record to the neighbor signatures of the other data records; and correlating the data records based on similarity match of the neighbor signatures.

10. A computer program product comprising a computer-readable storage medium having program instructions embodied therewith, wherein the program instructions are executable by a processor to cause the processor to:

receive topology information for a network, the topology information comprising a plurality of snapshots of a network topology associated with respective points in time, each snapshot represented as a graph of nodes, each node corresponding to a network resource and having a node identifier;

modify, for each snapshot, the graph by replacing nodes representing network resources having a same role in the network with a single aggregated node, wherein the modifying comprises:

identifying nodes in the network topology corresponding to scale nodes, wherein a scale node is a type of node for which multiple node instances are permitted to exist in the network topology at a same time;

identifying a group of two or more scale nodes that perform a same role and are connected to a same set of non-scale nodes for which only one node instance is permitted to exist in the network topology at any one time; and replacing scale nodes of the group of scale nodes with an aggregated node connected to the set of non-scale nodes in the network topology;

perform feature learning based on the modified graphs representing the plurality of snapshots, the feature learning determining a feature representation for each node in the modified graphs; and associate, for each node in the plurality of snapshots, the node identifier for the node with a corresponding feature representation in data storage for use in correlation of network resources, wherein node identifiers for nodes in a same aggregated node in a modified graph are associated with a same feature representation.

11. The computer program product of claim 10, wherein the graph of each snapshot comprises edges corresponding to connections between pairs of network resources, the method further comprising:

replacing edges between scale nodes of the group of scale nodes and each non-scale node within the set of non-scale nodes with an aggregated edge.

12. The computer program product of claim 10, wherein performing feature learning to determine a feature representation for each node of the modified graphs comprises:

obtaining, for each modified graph, samples for each node in the modified graph; and determining, for each node of the modified graphs, a feature representation based on samples obtained from all of the modified graphs representing the plurality of snapshots.

13. An apparatus comprising:

a feature learning module, the feature learning module comprising a processor and data storage, wherein the processor is configured to:

receive topology information for a network, the topology information comprising a plurality of snapshots of a network topology associated with respective points in time, each snapshot represented as a graph of nodes, each node corresponding to a network resource and having a node identifier;

modify, for each snapshot, the graph by replacing nodes representing network resources having a same role in the network with a single aggregated node, wherein the modifying comprises:

identifying nodes in the network topology corresponding to scale nodes, wherein a scale node is a type of node for which multiple node instances are permitted to exist in the network topology at a same time;

identifying a group of two or more scale nodes that perform a same role and are connected to a same set of non-scale nodes for which only one node instance is permitted to exist in the network topology at any one time; and replacing scale nodes of the group of scale nodes with an aggregated node connected to the set of non-scale nodes in the network topology;

perform feature learning based on the modified graphs representing the plurality of snapshots, the feature learning determining a feature representation for each node in the modified graphs; and associate, for each node in the plurality of snapshots, the node identifier for the node with a corresponding feature representation in the data storage for use in correlation of network resources, wherein node identifiers for nodes in a same aggregated node in a modified graph are associated with a same feature representation.

14. The apparatus of claim 13, wherein the graph of each snapshot comprises edges corresponding to connections between pairs of network resources, and wherein the processor is further configured to:

replace edges between scale nodes of the group of scale nodes and each non-scale node within the set of non-scale nodes with an aggregated edge.

15. The apparatus of claim 13, wherein the processor is configured to perform feature learning to determine a feature representation for each node of the modified graphs by:

obtaining, for each modified graph, samples for each node in the modified graph; and determining a feature representation for each node of the modified graphs based on samples obtained from all of the modified graphs representing the plurality of snapshots.

16. The apparatus of claim 15, wherein the processor is configured to obtain samples for each node by:

simulating a plurality of random walks starting from each node, wherein each random walk has a fixed walk length and sampling is based on predetermined transition probabilities at each of the steps of the walk; and wherein the processor is configured to determine a feature representation for each node by:

performing optimization using stochastic gradient descent to maximize a likelihood of preserving a network neighborhood for each node based on the random walk samples for the node for all of the modified graphs representing the plurality of snapshots; and determining a feature vector for the node based on the optimization.

17. The apparatus of claim 13, further comprising:
a correlation module for correlating data records, each data record associated with a network resource represented by a node of the network topology, the correlation module comprising a processor configured to:
receive data records from the network, each data record including a node identifier for a node associated with the data record; and
correlate the data records by matching the node identifiers of the data records.

18. The apparatus of claim 13, wherein, for each node in the modified graphs representing the plurality of snapshots, the processor is further configured to:
identify node neighbors for the node;
determine a neighbor signature for the node based on feature representations for identified neighbor nodes; and
associate, for each node in the plurality of snapshots, the node identifier for the node with a corresponding neighbor signature in the data storage, wherein node identifiers for nodes in a same aggregated node in a modified graph are associated with a same neighbor signature.

19. The apparatus of claim 18, further comprising:
a correlation module configured to correlate data records, each data record associated with a network resource represented by a node of the network topology, the correlation module comprising a processor configured to:
receive one or more data records from the network, each data record including a node identifier for a node associated with the data record;
add, to each data record, a neighbor signature corresponding to the node identifier included in the data record; and
correlate the data records by matching the neighbor signatures of the data records.

20. The apparatus of claim 19, wherein the correlation module processor is further configured to:
receive an input data record, the input data record including a node identifier that does not have match a node identifier in other data records;
receive a snapshot of the network topology associated with the time of the input data record;
identify node neighbors for the node corresponding to the node identifier of the input data record based on the received snapshot; and
determine a neighbor signature for the node corresponding to the node identifier of the input data record based on feature representations corresponding to the identified neighbor nodes in the data storage;
compare the determined neighbor signature for the node corresponding to the node identifier of the input data record to the neighbor signatures of the other data records; and
correlate the data records based on similarity match of the neighbor signatures.

\* \* \* \* \*